March 8, 1960  H. E. ETTER  2,928,003
CIRCUIT FOR GENERATING SWEEP VOLTAGE
Filed Jan. 17, 1958

INVENTOR.
HOWARD E. ETTER.
BY Alden D. Redfield
Charles M. Hogan
ATTORNEYS.

United States Patent Office 2,928,003
Patented Mar. 8, 1960

2,928,003

CIRCUIT FOR GENERATING SWEEP VOLTAGE

Howard E. Etter, Wayland, Mass., assignor to Avco Manufacturing Corporation, Cincinnati, Ohio, a corporation of Delaware Application January 17, 1958, Serial No. 709,654

1 Claim. (Cl. 250—27)

The present invention relates generally to circuits for generating sweep voltages, and specifically to a novel circuit for producing a voltage wave form having two slopes (X and Y, Fig. 2), one of which may be changed independently of the other.

The principal object of the present invention is to provide a sweep voltage generator, the output wave form of which comprises a first sloping portion, a second sloping portion, and a discontinuity (Z, Fig. 2) therebetween.

Another object of the present invention is to provide means for adjusting the time position of such discontinuity.

Figure 1:
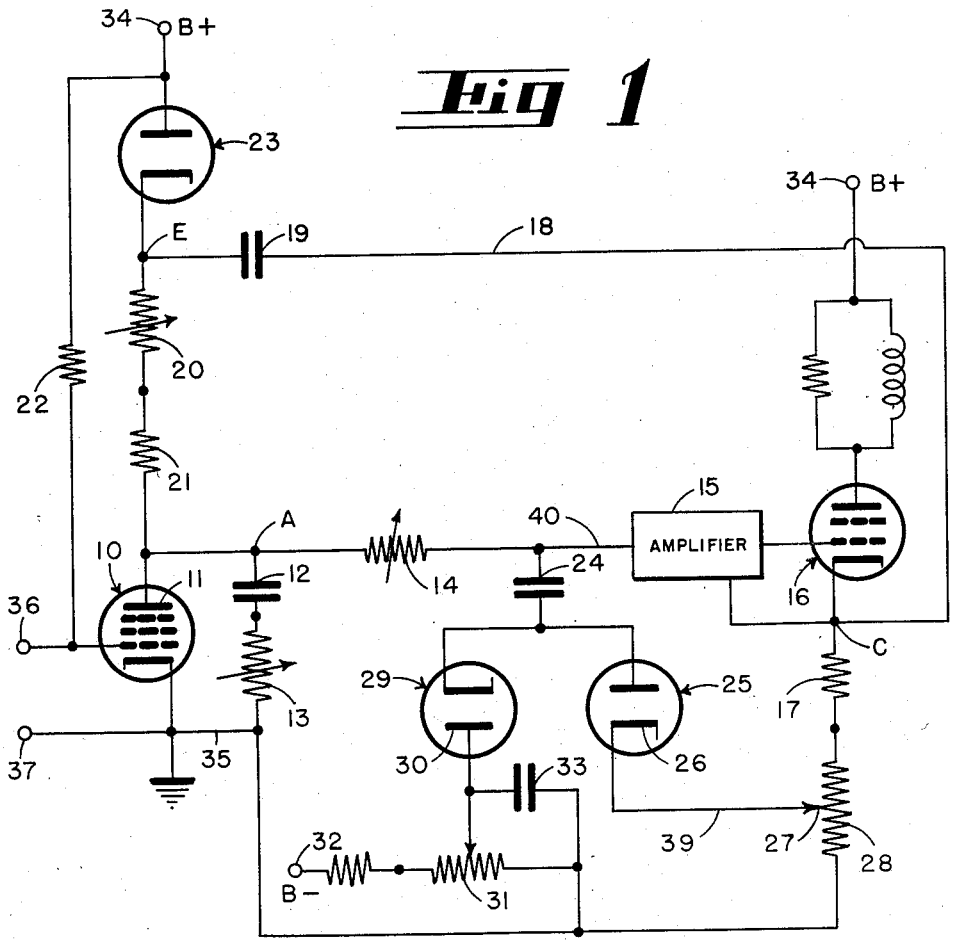
Figure 2:
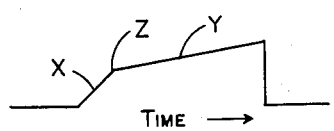

For a better understanding of the present invention, together with other and further objects, advantages, and capabilities thereof, reference is made to the following description of the accompanying drawings, in which:

Fig. 1 is a circuit schematic of a preferred embodiment of the present invention, and Fig. 2 is an illustrative wave form produced at the output of the Fig. 1 embodiment.

It may be seen from an inspection of Fig. 1 that the invention constitutes an improvement over the well-known basic boot strap sweep circuit. Reference is made to the following publications for a detailed description of boot strap sweep circuits generally:

"Principles of Radar," pages 3–18 to 3–20, M.I.T. Radar School Staff, McGraw-Hill, New York, 1946;
"Electron-Tube Circuits," pages 451–452 (specifically Figs. 20–24), Seely, McGraw-Hill, New York, 1950;
"Pulse and Digital Circuits," pages 228–232 (particularly Figs. 7–31), Millman and Taub, McGraw-Hill, New York, 1956.

In the following description, that portion of the Fig. 1 embodiment which is generic to conventional boot strap sweep generators is first discussed, and the improvements of the invention are then described.

In Fig. 1 there is shown a switching tube 10, the anode 11 of which is connected to the sweep capacitor 12. The sweep capacitor output is coupled either directly or by a resistor 14 to a suitable amplifier 15, the output of which is coupled to the control grid of tube 16 of the cathode follower output stage. In a manner characteristic of boot strap sweep generators, the high voltage cathode resistor terminal of tube 16 is capacitatively coupled, via line 18 and capacitor 19, to the upper terminal (Fig. 1) of the charging resistance 20, 21 for sweep capacitor 12, which charging resistance is in circuit between the anode 11 of pentode switching tube 10 and the positive terminal 34 of the power supply. Diode 23 is inserted in circuit between terminal 34 and the junction of the charging resistance and capacitor 19, in order to supply a low impedance charge path to capacitor 19 during the retrace or recycling interval. That is, between sweeps diode 23 maintains the voltage at its cathode essentially equal to the voltage at terminal 34.

By way of minor refinements, the preferred embodiment illustrated in Fig. 1 incorporates a variable resistance 20 in series with the principal charging resistance 21, a variable resistance 13 in series with the sweep capacitor 12, and a variable resistance 14 in series between anode 11 and amplifier 15. The resistances 13 and 14 are optional.

Dropping resistor 22 is connected between terminal 34 and the grid of switching tube 10 in order to apply to that tube a grid bias rendering it normally conductive.

In conventional operation of the circuit elements so far described, a pulse of negative polarity is applied via input terminals 36, 37 to the control grid circuit of switching tube 10, thereby cutting off the switching tube so that sweep capacitor 12 slowly charges.

As the potential at point A increases, the potentials at point C (cathode of tube 16) and E (junction of elements 20 and 19) also increase, and both ends of the charging resistance 20, 21 rise in voltage by nearly the same amount, so that the voltage across the charging resistance 20, 21 remains essentially constant. As a result, the current through charging resistance 20, 21, which is the charging current for the sweep capacitor 12, is very nearly constant throughout the sweep interval and the sweep voltage is nearly linear. At the end of the sweep, switching tube 10 becomes conductive, discharging the sweep capacitor. This would be the operation of the Fig. 1 embodiment in the absence of the inventive features, comprising the elements 24, 25, 27, 28, 29, 31, 32, 33, 39.

We have seen that the basic elements so far described produce a linear trace, essentially without discontinuity. The present invention provides a trace having a first linear slope portion (X, Fig. 2), a second linear slope portion (Y), and a discontinuity (Z). Further, the invention also provides means for determining the position of such discontinuity.

In accordance with the invention, therefore, there is added to the conventional boot strap system a novel circuit paralleling the sweep capacitor circuit. This novel circuit comprises "second slope" capacitor 24, diode 25, and conductor 39, arranged in circuit between conductor 40 and adjustable tap 27 on potentiometer 28. Further, in accordance with the invention, I insert potentiometer 28 in series with the cathode resistor 17, between the cathode of output tube 16 and ground conductor 35. The cathode 26 of diode 25 is connected to tap 27. The anode of diode 25 is connected to capacitor 24.

This novel circuitry radically changes the operation of the system. Assume now that switching tube 10 has just been cut off by a negative gate pulse. The voltage at point A linearly rises, producing a trace having a first linear slope X (Fig. 2). When the voltage at point A reaches a predetermined value, the bias on diode 25 occasioned by the connection of its cathode to positive point 27 is overcome, and the diode 25 becomes conductive, adding second slope capacitor 24 in parallel with sweep capacitor 12, whereby the slope of the trace is decreased as indicated by portion Y in Fig. 2. The decrease in slope depends upon the apparent capacity of capacitor 24, which is a function of the true capacity of the element 24 and the setting of adjustable tap 27. That is to say, the effective value of the capacitance introduced in parallel with the sweep capacitor 12 depends upon the difference between the amplitudes of the sawtooth waves at point A and the adjustable tap 27. Since the position of element 27 is adjustable, the slope of the sawtooth portion Y can be changed as desired.

It will be observed that a discontinuity Z (Fig. 2) occurs at the break between the linear slopes X and Y. When the position of slider 27 is shifted to change the slope, it also changes the time point on the composite wave at which the discontinuity occurs. In order to provide for fixing of the discontinuity in a given location, diode 29 and potentiometer 31 are provided. Diode 29 discharges capacitor 24 during retrace. The position of the adjustable tap on potentiometer 31 controls the amount of charge left on capacitor 24 at the end of retrace. By adjusting both potentiometer 31 and potentiometer 28, the second slope and the position of the discontinuity can be adjusted as desired, without affecting the initial slope X. Adjustment of the variable resistor 20 affects both slopes. Diode 29 is connected with reverse polarity relative to diode 25. The anode 30 of diode 29 is connected to an adjustable tap on potentiometer 31, the main terminals of the potentiometer being connected between a negative voltage terminal 32 and ground. Between anode 30 and ground there is provided capacitor 33 in order to establish a low impedance discharge path for capacitor 24.

Optional variable resistors 13 and 14 provide compensation for the inductance of the picture tube magnetic yoke (not shown).

It has been shown that the introduction of capacitance 24 in parallel with capacitance 12, by reason of the conductivity of diode 25, causes a change in slope. The amount of such change (i.e., the slope of portion Y, Fig. 2) is determined by varying the effective value of the capacitance introduced in parallel with capacitor 12. One way in which this could be done would be by varying the capacity of element 24 with a trimmer capacitor. I provide for a much larger variation in slope and larger change in the effective value of such parallel capacitance by varying the position of tap 27 on potentiometer 28.

The tap on potentiometer 31 is adjusted to position the "break point" or discontinuity Z. The settings of potentiometers 28 and 31 interact on each other, so that both are adjusted to obtain the desired slope and "break point" position.

The capacitance value of capacitor 33 is large compared to that of capacitor 24.

While there has been shown and described what is at present considered to be the preferred embodiment of the invention, it will be understood that various modifications and changes may be made by those skilled in the art without departing from the scope of the invention as set forth in the claims hereto appended.

I claim:

In a boot strap sweep circuit of the type including a charging resistance having a high potential terminal, a sweep capacitor connected in series with said charging resistance to form a time-constant network, a switching tube which conducts to discharge said sweep capacitor and is cut off to permit said sweep capacitor to be charged, said switching tube having an anode-cathode circuit in series with said charging resistance, a cathode follower stage having a cathode and cathode resistance consisting of a potentiometer having end terminals in series with the cathode of the cathode follower stage, means for coupling said sweep capacitor to said cathode follower stage, and a capacitive coupling from said cathode resistance to the high-potential terminal of said charging resistance, the improvement which comprises: a second capacitor adapted to be switched into shunt relationship to said sweep capacitor to provide a decreased slope in the amplitude-time charging characteristic of said network, a first diode adapted to switch said second capacitor into said relationship, said first diode having an anode, connected to the second capacitor, and a cathode, adjustable means for applying a bias to said first diode, said adjustable means comprising an adjustable tap on said potentiometer and a connection from the cathode of said diode to said tap, said adjustable means determining the apparent capacity of the second capacitor and therefore the extent of the decrease in slope, and means for controlling the time at which the decrease in slope occurs, by controlling the discharge-path impedance of the second capacitor, comprising a second diode, in series between said second capacitor and the cathode of the switching tube, the cathode of said second diode being connected to said second capacitor, and adjustable means for negatively biasing the anode of said second diode.

References Cited in the file of this patent

UNITED STATES PATENTS

| | | |
|---|---|---|
| 2,551,595 | Grieg | May 8, 1951 |
| 2,583,345 | Schade | Jan. 22, 1952 |
| 2,688,075 | Palmer | Aug. 31, 1954 |
| 2,695,955 | Casey | Nov. 30, 1954 |
| 2,727,144 | Heyde et al. | Dec. 13, 1955 |
| 2,849,609 | Casey | Aug. 26, 1958 |
| 2,897,358 | Casey | July 28, 1959 |
| 2,903,584 | Jaffee et al. | Sept. 8, 1959 |